(12) United States Patent
Huang et al.

(10) Patent No.: US 10,649,062 B2
(45) Date of Patent: May 12, 2020

(54) TERMINAL POSITIONING METHOD AND APPARATUS

(71) Applicant: CLOUDMINDS (SHENZHEN) ROBOTICS SYSTEMS CO., LTD., Guangdong (CN)

(72) Inventors: William Xiao-Qing Huang, Guangdong (CN); Haitao Jiang, Guangdong (CN); Zhenkai Wang, Guangdong (CN)

(73) Assignee: CLOUDMINDS (SHENZHEN) ROBOTICS SYSTEMS CO., LTD., Guangdong (CN)

( * ) Notice: Subject to any disclaimer, the term of this patent is extended or adjusted under 35 U.S.C. 154(b) by 0 days.

(21) Appl. No.: 16/431,793

(22) Filed: Jun. 5, 2019

(65) Prior Publication Data

US 2019/0285723 A1 Sep. 19, 2019

Related U.S. Application Data

(63) Continuation of application No. PCT/CN2016/110737, filed on Dec. 19, 2016.

(51) Int. Cl.
| | |
|---|---|
| *G01S 5/02* | (2010.01) |
| *H04W 4/02* | (2018.01) |
| *H04W 4/00* | (2018.01) |
| *H04W 64/00* | (2009.01) |

(52) U.S. Cl.
CPC .......... *G01S 5/0252* (2013.01); *G01S 5/0226* (2013.01); *H04W 4/02* (2013.01); *H04W 64/00* (2013.01)

(58) Field of Classification Search
CPC ...... G01S 5/0252; G01S 5/0226; H04W 4/02; H04W 64/00
USPC ........................................................ 455/456.1
See application file for complete search history.

(56) References Cited

U.S. PATENT DOCUMENTS

| | | | | |
|---|---|---|---|---|
| 2004/0203743 | A1* | 10/2004 | Macridis ............ | H04B 7/18539 455/427 |
| 2014/0056256 | A1* | 2/2014 | Kim .................... | H04W 72/046 370/329 |
| 2016/0291589 | A1 | 10/2016 | Ashoori et al. | |
| 2016/0360463 | A1* | 12/2016 | Kim ..................... | H04B 7/0617 |
| 2017/0257230 | A1* | 9/2017 | Son ...................... | H04B 7/0695 |

FOREIGN PATENT DOCUMENTS

| | | |
|---|---|---|
| CN | 103546963 A | 1/2014 |
| CN | 105578404 A | 5/2016 |

OTHER PUBLICATIONS

Catt,"UE Positioning Based on AoA+TA for LTE Rel-9", 3GPP TSG RAN WGl meeting #56,R1-090936, 2009, 5 pages.

\* cited by examiner

*Primary Examiner* — Inder P Mehra
(74) *Attorney, Agent, or Firm* — Hayes Soloway PC

(57) ABSTRACT

The present disclosure provides a terminal positioning method and apparatus. The method comprises: obtaining beam information corresponding to a terminal; obtaining a time advance amount of the terminal in a serving cell; and determining location information of the terminal according to the beam information and the time advance amount. The present disclosure may solve the technical problem of low terminal positioning precision.

19 Claims, 7 Drawing Sheets

TERMINAL POSITIONING METHOD AND APPARATUS

CROSS-REFERENCE TO RELATED APPLICATION

This application is continuation application under 35 U.S.C. § 120 of PCT application No. PCT/CN2016/110737 filed on Dec. 19, 2016, the contents of which are incorporated herein by reference.

FIELD OF THE INVENTION

The present disclosure relates to the field of the Internet, and in particular, to a terminal positioning method and apparatus.

BACKGROUND OF THE INVENTION

With the rapid development of the mobile Internet, accurate location information is extremely important for mobile Internet companies and users. On one hand, the mobile Internet companies need to use the location information to portray users and to perform value mining and accurate advertising. On the other hand, the users need accurate location information to enhance the experience.

In the prior art, a GPS (Global Positioning System) is a commonly used positioning method, but its precision is limited (on the order of tens of meters), and may not be used in many scenarios. Moreover, there are many positioning methods based on cellular mobile communication networks at present, such as OTDOA (Observed Time Difference of Arrival) technology, but the positioning precision of the positioning technology is about 50-100 meters, and the positioning precision is still low and may not meet the service needs in the future.

SUMMARY OF THE INVENTION

The present disclosure provides a terminal positioning method and apparatus for at least solving the technical problem of low terminal positioning precision in the prior art.

In order to achieve the above object, according to a first aspect of embodiments of the present disclosure, a terminal positioning method is provided, applied to a transmission device, comprising: obtaining beam information corresponding to a terminal; obtaining a time advance amount of the terminal in a serving cell; and determining location information of the terminal according to the beam information and the time advance amount.

According to a second aspect of the embodiments of the present disclosure, a terminal positioning method is provided, applied to a terminal, comprising: obtaining beam information; and sending the beam information to a transmission device, so that the transmission device determines location information of the terminal according to the beam information and a time advance amount after obtaining the time advance amount of the terminal in a serving cell.

A third aspect provides a terminal positioning apparatus, applied to a transmission device, comprising: a first obtaining module, configured to obtain beam information corresponding to a terminal; a second obtaining module, configured to obtain a time advance amount of the terminal in a serving cell; and a location determining module, configured to determine location information of the terminal according to the beam information and the time advance amount.

A fourth aspect provides a terminal positioning apparatus, applied to a terminal, comprising: an information obtaining module, configured to obtain beam information; and an information sending module, configured to send the beam information to a transmission device, so that the transmission device determines location information of the terminal according to the beam information and a time advance amount after obtaining the time advance amount of the terminal in a serving cell.

A fifth aspect provides a non-transitory computer readable storage medium, the non-transitory computer readable storage medium comprises one or more programs, and the one or more programs are used for executing the method of the above first aspect.

A sixth aspect provides a non-transitory computer readable storage medium, the non-transitory computer readable storage medium comprises one or more programs, and the one or more programs are used for executing the method of the above second aspect.

A seventh aspect provides a transmission device, and the transmission device comprises:

the non-transitory computer readable storage medium of the above fifth aspect; and one or more processors for executing a program in the non-transitory computer readable storage medium.

An eighth aspect provides a terminal, and the terminal comprises:

the non-transitory computer readable storage medium of the above sixth aspect; and one or more processors for executing a program in the non-transitory computer readable storage medium.

By adoption of the above technical solutions, the beam information corresponding to the terminal is obtained, the time advance amount of the terminal in the serving cell is obtained, and the location information of the terminal is determined according to the beam information and the time advance amount. In this way, by positioning the terminal through the beam information corresponding to the terminal and the time advance amount of the terminal in the serving cell, high-precision terminal positioning may be achieved, and the beam information of only one base station is needed to achieve the positioning in the solution, therefore the positioning implementation complexity is low.

DETAILED DESCRIPTION OF THE EMBODIMENTS

The specific embodiments of the present disclosure will be described in detail below in combination with the drawings. It should be understood that the specific embodiments described herein are merely used for illustrating and explaining the present disclosure, rather than limiting the present disclosure.

The present disclosure may be applied to the 5G (fifth generation mobile communication technology) technology. In the 5G technology, a mobile communication system will use a millimeter wave band, and in order to overcome the large increase in the propagation loss, it is necessary to use a large-scale antenna to perform beam forming, and the increase in the propagation loss is compensated by a provided gain, one possible way is to use a hybrid beam forming mode combining analog beam forming with digital beam forming, a 3 dB bandwidth of an analog beam is relatively wide but the gain is relatively small, the 3 dB bandwidth of a digital beam is relatively narrow but the gain is relatively large, therefore, after the large-scale antenna array technology in the millimeter wave band is used, each cell will have more than 10 analog beams and more than 20 digital beams.

In the prior art, when a terminal is positioned, the commonly used positioning technology is the GPS, but with the rapid development of the mobile Internet, the positioning precision of the GPS may not meet the needs of the user. Moreover, the current positioning based on a cellular mobile communication network generally includes OTDOA (Observed Time Difference of Arrival) technology, and the OTDOA technology calculates the location of the terminal by measuring the time difference of arrival of two or more base stations, but the positioning precision of the positioning technology is about 50-100 meters, thus the positioning precision is still low and may not meet the requirements of the future 5G services for the positioning, furthermore, the technology requires multiple base stations to jointly perform positioning, so that the positioning complexity is high.

In order to solve the above problems, the present disclosure provides a terminal positioning method and apparatus. In the method, a terminal is positioned through beam information and a time advance amount, the positioning precision is higher (achieving the precision within 10 meters), and the present disclosure does not require the joint positioning of multiple base stations and only requires the beam information of one base station to achieve the positioning of the terminal, therefore the positioning complexity is lower, compared with the prior art.

The solution of the present disclosure will be described in detail below in combination with specific embodiments.

Figure 1:
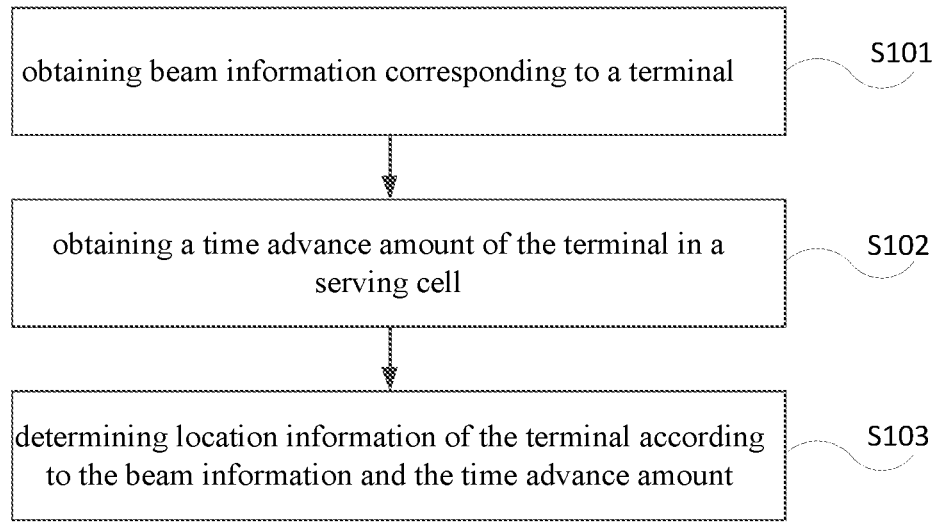
FIG. 1 is a schematic flow diagram of a terminal positioning method provided by an embodiment of the present disclosure.

FIG. 1 shows a terminal positioning method provided by an embodiment of the present disclosure, as shown in FIG. 1, the method may be applied to a transmission device, wherein the transmission device may be a base station or a transmission point, and the method comprises:

S101. obtaining beam information corresponding to a terminal.

S102. obtaining a time advance amount of the terminal in a serving cell.

S103. determining location information of the terminal according to the beam information and the time advance amount.

By adoption of the method, by positioning the terminal through the beam information corresponding to the terminal and the time advance amount of the terminal in the serving cell, high-precision terminal positioning may be achieved, and the beam information of only one base station is needed to achieve the positioning in the solution, therefore the positioning implementation complexity is low.

Figure 2:
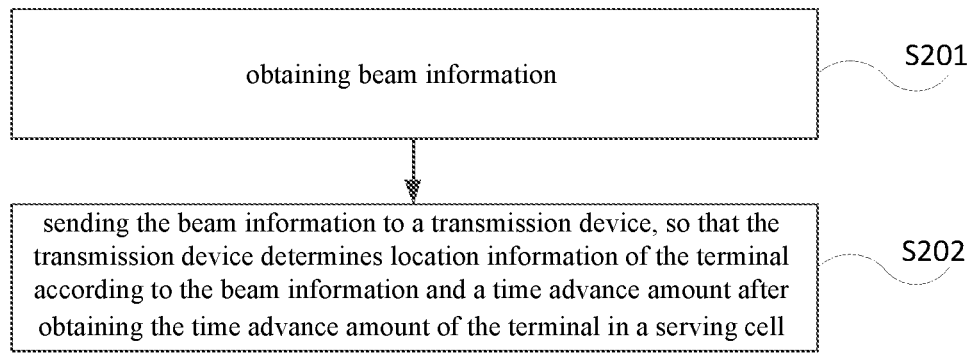
FIG. 2 is a schematic flow diagram of another terminal positioning method provided by an embodiment of the present disclosure.

FIG. 2 shows a terminal positioning method provided by an embodiment of the present disclosure, as shown in FIG. 2, the method may be applied to a terminal, and the method comprises:

S201. obtaining beam information.

S202. sending the beam information to a transmission device, so that the transmission device determines location information of the terminal according to the beam information and a time advance amount after obtaining the time advance amount of the terminal in a serving cell.

By adoption of the method, the terminal sends the obtained beam information to the transmission device, so that the transmission device positions the terminal according to the beam information and the time advance amount, thereby achieving high-precision terminal positioning, and the beam information of only one base station is needed to achieve the positioning in the solution, therefore the positioning implementation complexity is low.

Figure 3:
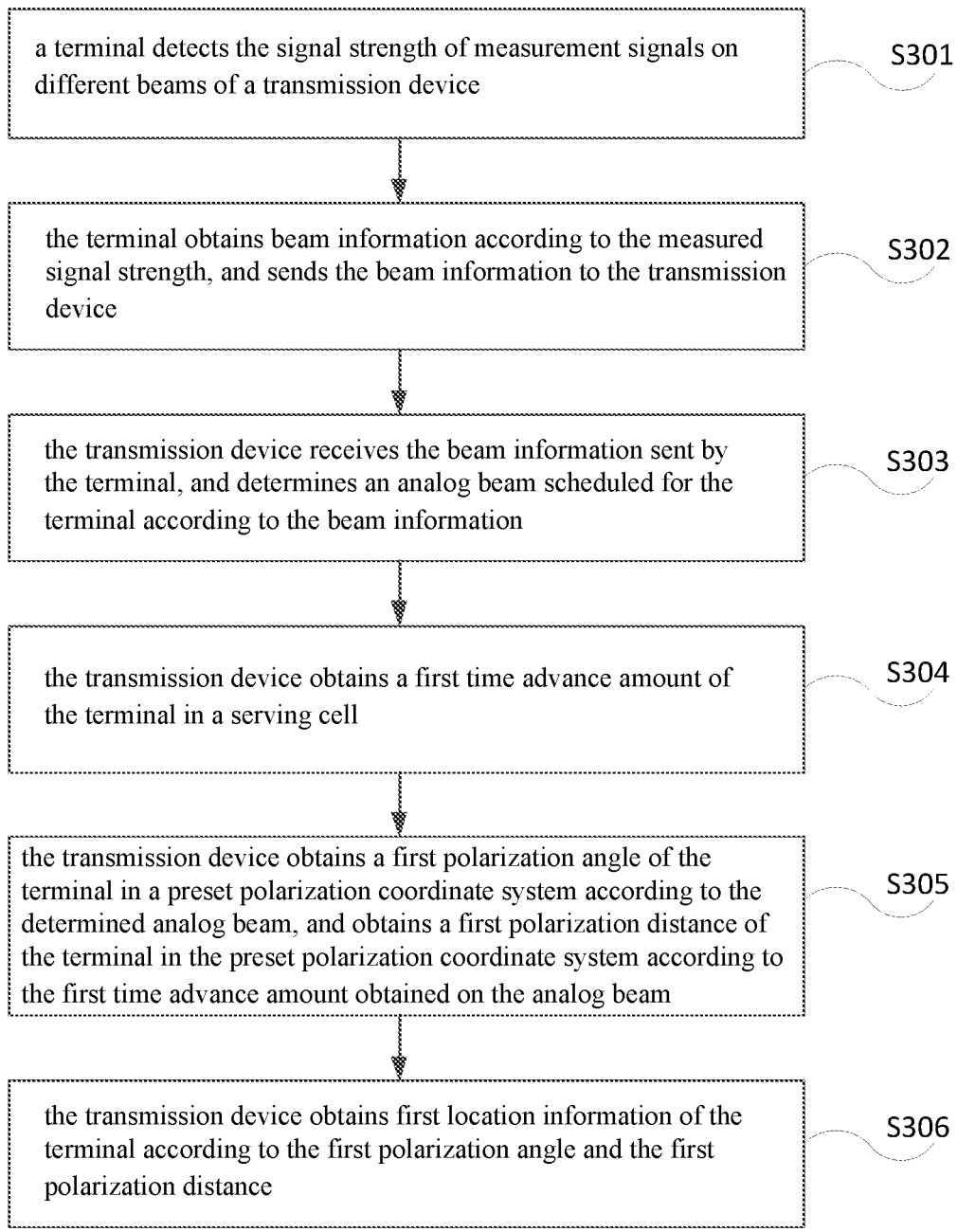
FIG. 3 is a schematic flow diagram of a third terminal positioning method provided by an embodiment of the present disclosure.

FIG. 3 shows a terminal positioning method provided by an embodiment of the present disclosure, and as shown in FIG. 3, the method comprises:

S301. a terminal detects the signal strength of measurement signals on different beams of a transmission device.

The transmission device may be a base station, and the measurement signal may include: a primary synchronization signal (Primary Synchronization Signal, PSS); or a secondary synchronization signal (Secondary Synchronization Signal, SSS); or a shared reference symbol, wherein the shared reference symbol is a reference symbols shared by all users under the beam.

S302. the terminal obtains beam information according to the measured signal strength, and sends the beam information to the transmission device.

In the present step, the beam information may be obtained in the following three manners, and the beam information is sent to the transmission device:

Manner 1: the terminal determines a first beam whose signal strength is greater than or equal to a first preset strength threshold, obtains the beam information according to the first identification information of the first beam, and sends the beam information to the transmission device, thereby ensuring that the beam subsequently scheduled by the transmission device to the terminal may meet the normal signal transmission requirements.

Manner 2: the terminal determines a second beam with the maximal signal strength, obtains the beam information according to the second identification information of the second beam, and sends the beam information to the transmission device.

In another embodiment of the present disclosure, the beam information further comprises: the signal strength corresponding to the second beam, and the terminal obtains the beam information according to the signal strength, so that the transmission device may determine a beam scheduled for the terminal according to the signal strength in the beam information sent by the terminal.

Manner 3: the beam information may be a random access request, the terminal generates the random access request, determines a second beam with the maximal signal strength, and sends the random access request to the transmission device on the second beam.

S303. the transmission device receives the beam information sent by the terminal, and determines an analog beam scheduled for the terminal according to the beam information.

In the present step, if the beam information sent by the above step S302 comprises the first identification information of the first beam, the transmission device determines the current load of each first beam according to the first identification information, and determines the first beam in which the load is less than or equal to the preset load threshold as the analog beam. Therefore, the situation that a full-load beam is scheduled to the terminal, resulting in that the terminal cannot work, is avoided.

If the beam information sent in the above step S302 comprises the second identification information of the second beam, the second beam is determined as the analog beam according to the second identification information, but considering that the signal strength corresponding to the second beam may still cannot meet the normal communication requirements, therefore, in another embodiment of the present disclosure, the beam information may further include the signal strength of the second beam, in this way, the transmission device determines whether the signal corresponding to the second beam is greater than or equal to a second preset strength threshold according to the second identification information, and when the signal strength is greater than or equal to the second preset strength threshold, determines the second beam as the analog beam, thereby ensuring that the analog beam scheduled for the terminal may meet the normal communication requirements.

If the beam information sent in the above step S302 is the random access request, the transmission device receives the random access request sent by the terminal on the second beam, and determines the second beam is the analog beam.

S304. the transmission device obtains a first time advance amount of the terminal in a serving cell.

In the present step, firstly, the transmission device receives the random access request or an uplink reference signal sent by the terminal in the serving cell, herein, in the case that the transmission device receives the random access request sent by the terminal, with respect to the manner 1 and the manner 2 in the above step S302, after the analog beam is determined, the transmission device receives the random access request sent by the terminal, with respect to the manner 3 in the above step S303, since the beam information in the manner 3 is the random access request, the transmission device may determine the analog beam after receiving the random access request, and after the analog beam is determined, the terminal does not need to send the random access request again. In the case that the transmission device receives the uplink reference signal sent by the terminal, the transmission device sends uplink reference signal configuration information to the terminal after determining the analog beam, wherein the uplink reference signal configuration information comprises a beam identifier and configuration information of the analog beam, the configuration information may be the frequency, the bandwidth, the modulation and coding mode and the like of the uplink reference signal, this is not limited in the present disclosure, and the terminal sends the uplink reference signal to the transmission device according to the configuration information on the analog beam marked by the beam identifier after receiving the uplink reference signal configuration information.

Secondly, after receiving the random access request or the uplink reference signal, the transmission device obtains the first time advance amount according to a difference value between a receiving time point and a preset time, wherein the preset time may be an uplink unified receiving time configured by the transmission device for all terminals.

S305. the transmission device obtains a first polarization angle of the terminal in a preset polarization coordinate system according to the determined analog beam, and obtains a first polarization distance of the terminal in the preset polarization coordinate system according to the first time advance amount obtained on the analog beam.

Wherein, the preset polarization coordinate system may be a polarization coordinate system generated by using the transmission device as a circle center and using a preset direction as a polar axis.

In a possible implementation manner, the first polarization angle may be obtained in the following manner: determining the first polarization angle of the location of the terminal according to the determined analog beam, the total number of beams under the transmission device and the width of each beam.

It should be noted that the analog beam may include a horizontal analog beam and a vertical analog beam, in practical application, the first polarization angle and the first polarization distance may be calculated by using the horizontal analog beam or the vertical analog beam, or, the first polarization angle and the first polarization distance under the horizontal analog beam, and the first polarization angle and the first polarization distance under the vertical analog beam are both calculated, and generally, the calculation of the first polarization angle and the first polarization distance under the vertical analog beam is optional.

Figure 4:
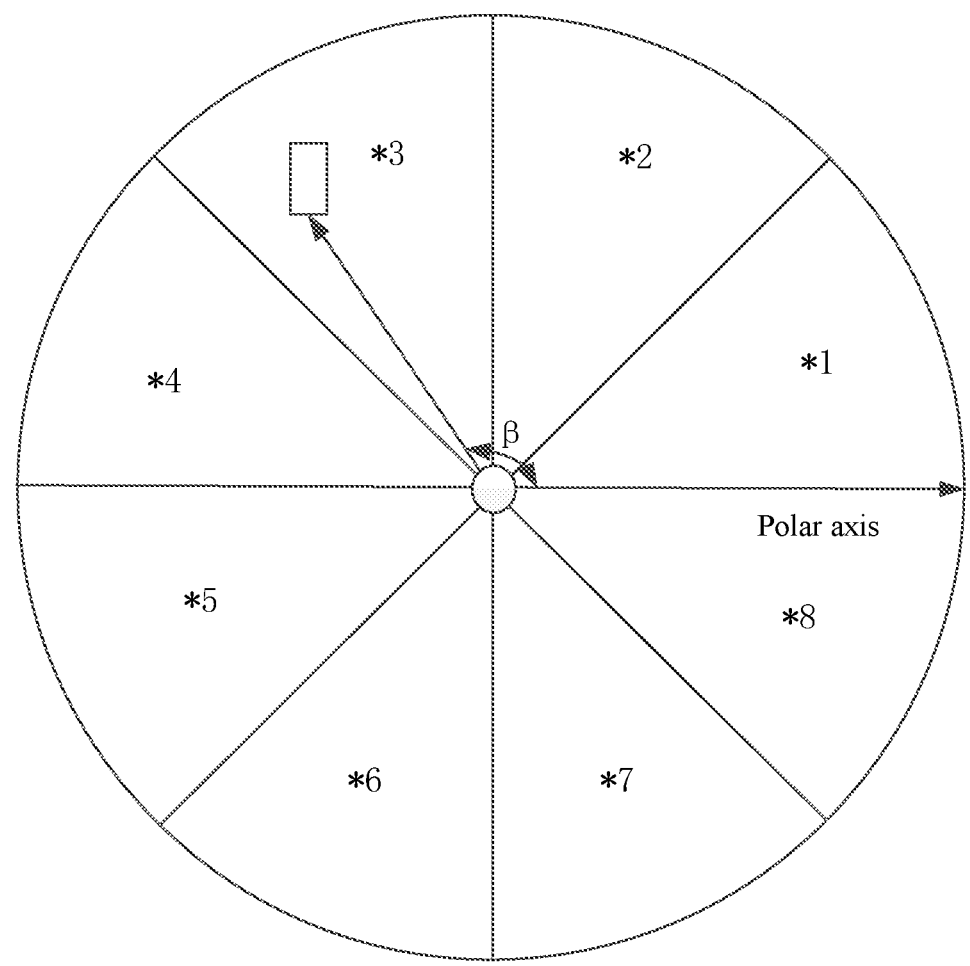
FIG. 4 is a calculation schematic diagram of horizontal analog beam positioning provided by an embodiment of the present disclosure.

The calculation of the first polarization angle in the present step is described by taking the horizontal analog beam as an example, for example, as shown in FIG. 4, the polar axis is set at a starting location of a beam *1, the first polarization angle is determined counterclockwise (or clockwise), a dot in the figure is the location of the transmission device, a rectangular frame in the figure is the location of the terminal, the coverage of the transmission device is composed of coverage areas of a plurality of beams, for example, the horizontal analog beam generated by the transmission device in the figure includes: the beam *1, a beam *2, a beam *3, a beam *4, a beam *5, a beam *6, a beam *7 and a beam *8, the width of each beam is x, the beam identifier of the beam where the terminal is located is *3, then the first polarization angle β of the terminal ranges from [2x, 3x], that is, between an angle (2x) corresponding to the starting location of the beam *3 and an angle (3x) corresponding to a termination location, the final value of β may be determined in various manners, for example, the angle corresponding to the starting location of the beam where the terminal is located is selected to serve as the first polarization angle of the terminal, or, the angle corresponding to the termination location of the beam where the terminal is located is selected to serve as the first polarization angle of the terminal, or, the angle corresponding to any location between the starting location and the termination location of the beam where the terminal is located is selected to serve as the first polarization angle of the terminal, for example, the angle corresponding to the middle location of the beam where the terminal is located is selected to serve as the first polarization angle, and this is not limited in the present disclosure.

Figure 5:
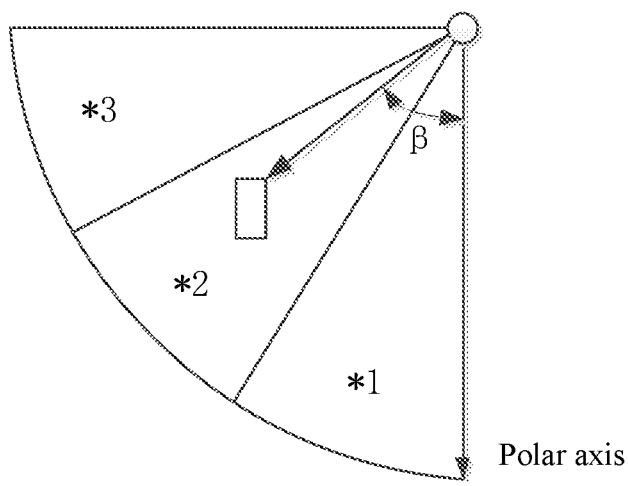
FIG. 5 is a calculation schematic diagram of vertical analog beam positioning provided by an embodiment of the present disclosure.

The calculation of the first polarization angle in the present step is described by taking the vertical analog beam as an example, for example, as shown in FIG. 5, the polar axis is set at the starting location of a beam *1 (that is the vertical downward direction as a polar axis direction), the polarization angle is determined clockwise (or counterclockwise), the dot in the figure is the location of the transmission device, the rectangular frame in the figure is the location of the terminal, the coverage of the transmission device is composed of coverage areas of a plurality of beams, the vertical analog beam generated by the transmission device includes: the beam *1, a beam *2 and a beam *3, the width of each beam is x, the beam identifier of the beam where the terminal is located is *2, then the first polarization angle β of the terminal ranges from [x, 2x], that is, between an angle (x) corresponding to the starting location of the beam *2 and an angle (2x) corresponding to the termination location, similarly, the final value of β may be determined in various manners, for example, the angle corresponding to the starting location of the beam where the terminal is located is selected to serve as the first polarization angle of the terminal, or, the angle corresponding to the termination location of the beam where the terminal is located is selected to serve as the first polarization angle of the terminal, or, the angle corresponding to any location between the starting location and the termination location of the beam where the terminal is located is selected to serve as the first polarization angle of the terminal, for example, the angle corresponding to the middle location of the beam where the terminal is located is selected to serve as the first polarization angle, and this is not limited in the present disclosure.

Thus, the first polarization angle β of the location where the terminal is located may be obtained by the above manners.

After the first time advance amount is obtained, the first polarization distance may also be obtained in the following manner in the present step, wherein the first polarization distance may be a polarization distance calculated based on the horizontal analog beam, and may also be a polarization distance calculated based on the vertical analog beam, the specific calculation manner is the same, and in the present embodiment, the calculation manner is as follows:

The transmission device obtains an electromagnetic wave transmission speed of the beam where the terminal is located, and obtains the first polarization distance by the following formula:

$$Ts*V=2D$$

wherein, Ts represents the time advance amount, V represents the electromagnetic wave transmission speed, and D represents the distance between the terminal and the transmission device (i.e., the first polarization distance).

S306. the transmission device obtains first location information of the terminal according to the first polarization angle and the first polarization distance.

After the first polarization angle β and the first polarization distance D are determined, the first location information (D, β) can be obtained.

It should be noted that, if the first polarization angle β and the first polarization distance D are obtained based on the horizontal analog beam, the first location information is horizontal location information, and if the first polarization angle β and the first polarization distance D are obtained based on the vertical analog beam, the first location information is vertical location information.

After the first location information is obtained, the following two processing manners may be included: one processing manner is to send the first location information to the terminal or a location server; and the other processing manner is that, considering that rectangular coordinates are more intuitive, therefore, the obtained first location information may be converted into a rectangular coordinate system, and the converted first location information is sent to the terminal or the location server.

For example, the first location information may be sent to the terminal or the location server through dedicated signaling or an MAC (Media Access Control) message or a NAS (Non-access stratum) message.

It should be noted that, the first location information of the terminal is obtained through the analog beam in the above step S304 to the step S306, the present disclosure may also obtain the second location information of the terminal through a digital beam, wherein the analog beam is implemented by the phase adjustment of an analog device, the number of formed beams is usually small, the width of a single beam is wider, and the gain is lower; and the digital beam is formed in a digital signal processing manner, the number of beams is large, the width of the single beam is narrower, and the gain is higher, therefore, the precision of the first location information obtained by the analog beam is lower than that of the second location information, but the location information is obtained faster, although the precision of the second location information is higher than that of the first location information, the location information is obtained slower, this is because the logical sequence of beam forming is to form the analog beam at first, and then form the digital beam, that is to say, after the analog beam is formed, a base station and the terminal need to exchange some information to obtain the information of the digital beam, the delay caused by the information interaction process delays the obtaining the location information of the terminal.

Figure 6:
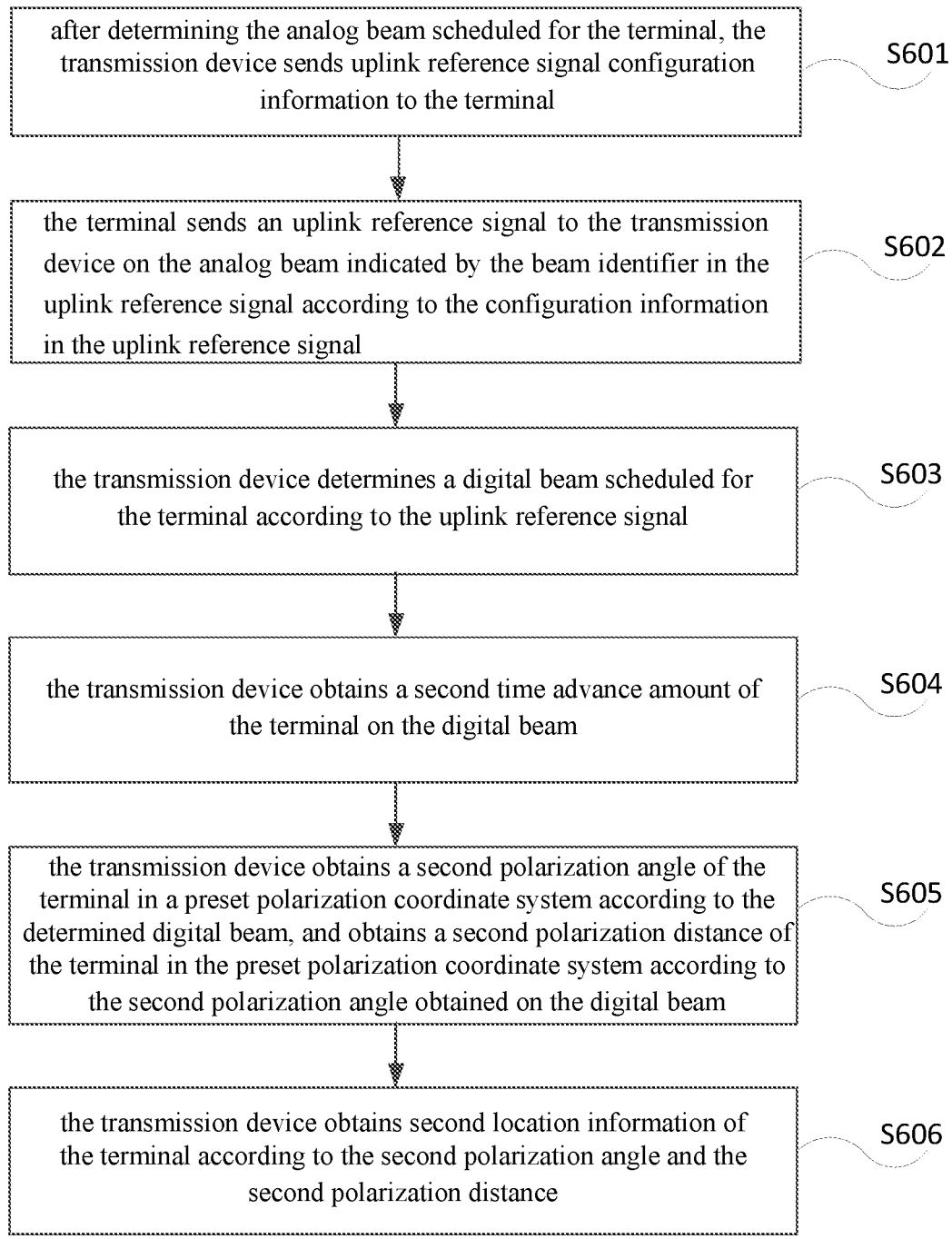
FIG. 6 is a schematic flow diagram of a fourth terminal positioning method provided by an embodiment of the present disclosure.

The method for obtaining the second location information is described below with reference to FIG. 6, and the method comprises:

S601. after determining the analog beam scheduled for the terminal, the transmission device sends uplink reference signal configuration information to the terminal.

For the specific steps of determining the analog beam scheduled for the terminal, reference may be made to the above steps S301 to S303, and are not repeated redundantly herein.

The uplink reference signal configuration information comprises a beam identifier and configuration information of the analog beam, the configuration information includes the frequency, the bandwidth, the modulation and coding mode and other information of an uplink reference signal S602. the terminal sends an uplink reference signal to the transmission device on the analog beam indicated by the beam identifier in the uplink reference signal according to the configuration information in the uplink reference signal.

S603. the transmission device determines a digital beam scheduled for the terminal according to the uplink reference signal.

In the present step, after receiving the uplink reference signal, the transmission device determines all channel information of the terminal in all or part of the bandwidth in the analog beam, and the transmission device may configure a weighting coefficient corresponding to the digital beam according to the channel information so as to determine the digital beam scheduled for the terminal according to the weighting coefficient.

S604. the transmission device obtains a second time advance amount of the terminal on the digital beam.

S605. the transmission device obtains a second polarization angle of the terminal in a preset polarization coordinate system according to the determined digital beam, and obtains a second polarization distance of the terminal in the preset polarization coordinate system according to the second polarization angle obtained on the digital beam.

For the calculation of the second polarization angle and the second polarization distance, reference may be made to the description in the above step S305 above, and is not repeated redundantly herein.

S606. the transmission device obtains second location information of the terminal according to the second polarization angle and the second polarization distance.

After the second location information is obtained, the following two processing manners may be included: one processing manner is to send the second location information to the terminal or the location server; and the other processing manner is that, considering that rectangular coordinates are more intuitive, therefore, the obtained second location information may be converted into a rectangular coordinate system, and the converted second location information is sent to the terminal or the location server.

For example, the second location information may be sent to the terminal or the location server through dedicated signaling or an MAC (Media Access Control) message or a NAS (Non-access stratum) message.

It should be noted that, according to the precision requirements and the delay requirements of the positioning service of the terminal, whether to send the first location information (the precision requirements are not high, the delay requirements are higher) or the second location information (the precision requirements are higher) to the terminal or the location sever may be determined in practice, or, the second location information (accurate positioning) is sent after the first location information (assisting the primary positioning of the terminal), and this is not limited in the present disclosure.

In summary, by adoption of the terminal positioning method in the present disclosure, accurate positioning can be achieved. Compared with the prior art, the positioning precision of the terminal positioning in the present disclosure may reach within 10 meters, and the positioning precision of the terminal positioning in the present disclosure is illustrated below.

Figure 7:
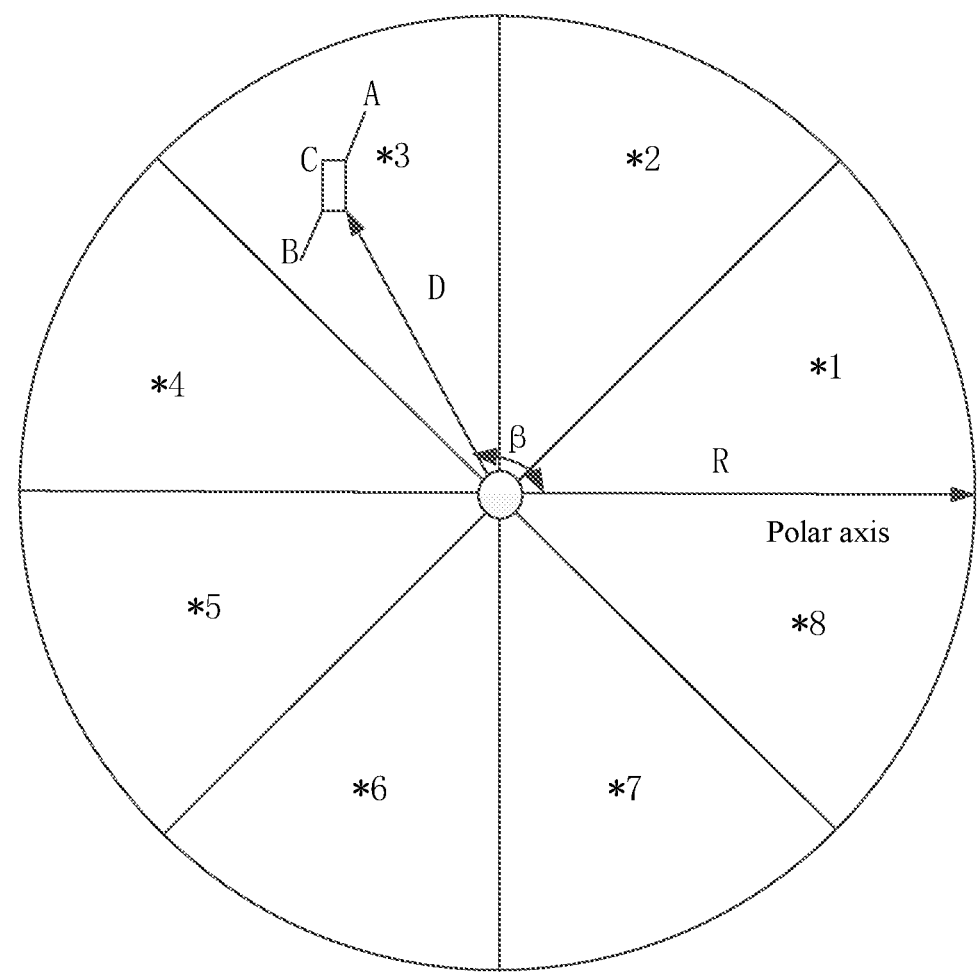
FIG. 7 is a calculation schematic diagram of horizontal analog beam positioning precision provided by an embodiment of the present disclosure.

The positioning precision of the terminal positioning using the horizontal analog beam is taken as an example for illustration. As shown in FIG. 7, the terminal is located at the beam *3, the actual location is C, the width of each beam is x, the range of the polarization angle β of the terminal is [2x, 3x], assuming that a radial polarization distance of the terminal is D and the error is ΔD, then an extreme radial distance of the terminal is D±ΔD, the coordinates of a point A are (2x+x/2, D+ΔD), and the coordinates of a point B are (3x, D−ΔD), then the maximum error is the distance between AB, and it can be seen according to the cosine theorem that, $AB^2=2D^2+2(\Delta D)^2-2(D-\Delta D)\cos(x/2)$. Assuming that the cell radius R=50 meters, the width of each beam x=12 degrees, the radial distance error is ΔD, and the radial distance error depends on the estimation accuracy of the base station on the time advance amount of the terminal, in the existing 4G technology, the time advance amount of the minimal granularity is Ts=32.55 ns, a corresponding propagation distance is 9.77 meters (including a two-way propagation distance between the downlink and the uplink) and is converted into a one-way distance of 4.89 meters, the 5G technology may adopt a time advance amount with smaller granularity, which is expected to further reduce the radial distance error, referring to a 5G subframe design (the length of a 5G subframe is ⅒ of a 4G subframe), assuming that the minimum unit of the time advance amount of the 5G technology is 0.1 Ts, and the corresponding distance error ΔD is approximately 0.5 meters. After being substituted into the formula, AB=5 meters, it indicates that the error is 5 meters.

Figure 8:
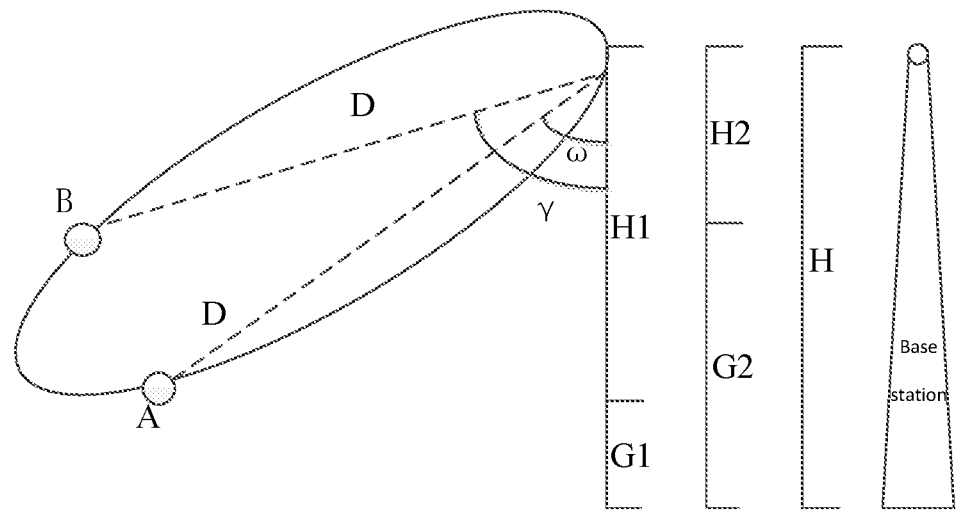
FIG. 8 is a calculation schematic diagram of vertical analog beam positioning precision provided by an embodiment of the present disclosure.

The positioning precision of the terminal positioning using the vertical analog beam is taken as an example for illustration. As shown in FIG. 8, the height of the base station is H, the terminal is at a point A (i.e., a starting angle location of the vertical beam), an included angle between the point A and the base station is ω, the distance between the point A and the base station is D, and the height of the terminal at the point A is G1, H1=D cos ω, then G1=H−H1, the terminal is at a point B (i.e., an ending angle location of the vertical beam), an included angle between the point B and the base station is γ, the distance between the point B and the base station is D, and the height of the terminal at the point A is G2, H2=D cos γ, then G2=H−H2, the maximum error is the distance between AB, then AB=G2−G1=D (cos γ−cos ω), assuming D is 20 meters, ω is 30 degrees and γ is 60 degrees, then AB is about 7.32 meters, it indicates that the error is 7.32 meters.

As can be seen above, the positioning precision of the terminal positioning using the vertical analog beam may reach 10 meters or less in the present solution. In addition, the positioning precision of the terminal positioning using the digital beam may still reach 10 meters or less. For the specific description of the positioning precision, reference may be made to the description of the positioning precision of the terminal positioning using the analog beam, and thus is not repeated redundantly herein.

By adoption of the method, by positioning the terminal through the beam information corresponding to the terminal and the time advance amount of the terminal in the serving cell, high-precision terminal positioning may be achieved, and the beam information of only one base station is needed to achieve the positioning in the solution, therefore the positioning implementation complexity is low.

Figure 9:
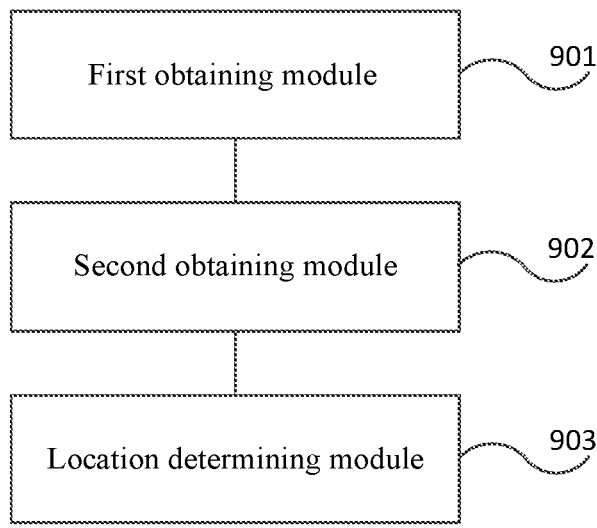
FIG. 9 is a structural schematic diagram of a terminal positioning apparatus provided by an embodiment of the present disclosure.

FIG. 9 shows a terminal positioning apparatus provided by the present disclosure, applied to a transmission device, as shown in FIG. 9, comprising:

a first obtaining module 901, configured to obtain beam information corresponding to a terminal;

a second obtaining module 902, configured to obtain a time advance amount of the terminal in a serving cell; and a location determining module 903, configured to determine location information of the terminal according to the beam information and the time advance amount.

Figure 10:
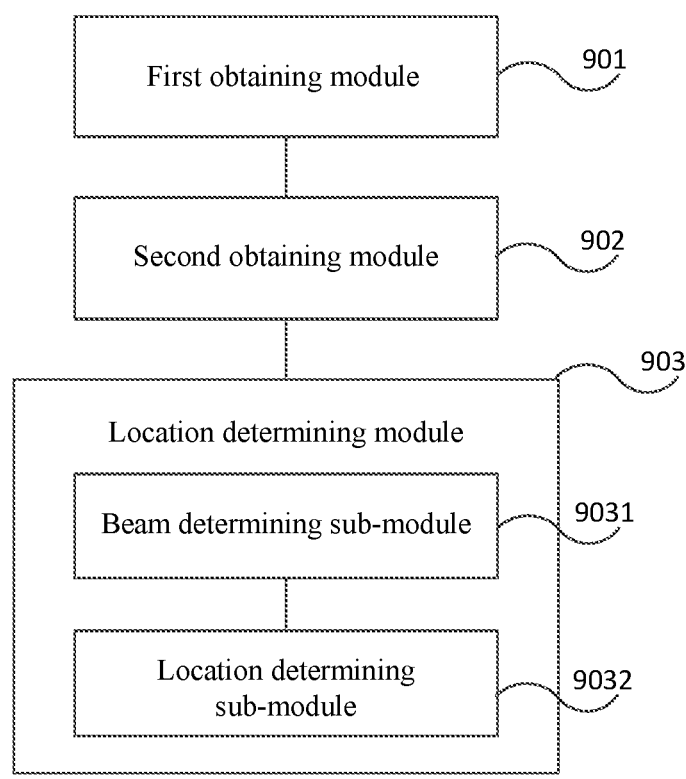
FIG. 10 is a structural schematic diagram of another terminal positioning apparatus provided by an embodiment of the present disclosure.

Optionally, as shown in FIG. 10, the location determining module 903 comprises:

a beam determining sub-module 9031, configured to determine a beam scheduled for the terminal according to the beam information; and a location determining sub-module 9032, configured to determine the location information of the terminal according to the determined beam and the time advance amount.

Optionally, the location determining sub-module 9032 is configured to determine the location information of the terminal according to the determined beam and the time advance amount through a preset polarization coordinate system; wherein the preset polarization coordinate system is a polarization coordinate system generated by using the transmission device as a circle center and using a preset direction as a polar axis.

Optionally, the location determining sub-module 9032 is configured to obtain a polarization angle of the terminal in the preset polarization coordinate system according to the determined beam, obtain a polarization distance of the terminal in the preset polarization coordinate system according to the time advance amount obtained on the serving cell, and obtain the location information of the terminal according to the polarization angle and the polarization distance.

Optionally, the location determining sub-module 9032 is configured to determine the polarization angle of the location of the terminal according to the determined beam, the total number of beams under the transmission device and the width of each beam.

Optionally, the location determining sub-module 9032 is configured to select an angle corresponding to a starting location of the beam where the terminal is located to serve as the polarization angle of the terminal; or, select the angle corresponding to a termination location of the beam where the terminal is located to serve as the polarization angle of the terminal; or, select the angle corresponding to any location between the starting location and the termination location of the beam where the terminal is located to serve as the polarization angle of the terminal.

Optionally, the first obtaining module 901 is configured to receive the beam information reported by the terminal; and the beam determining sub-module 9031 is configured to determine an analog beam scheduled for the terminal according to the beam information.

Optionally, the beam information comprises first identification information of a first beam, and the first beam is a beam, which is obtained by the terminal by measuring the signal strength of measurement signals on different beams of the transmission device and has signal strength greater than or equal to a first preset signal strength threshold; and the beam determining sub-module 9031 is configured to determine the current load of each first beam according to the first identification information, and determine the first beam whose load is less than or equal to a preset load threshold as the analog beam.

Optionally, the beam information comprises second identification information of a second beam, and the second beam is a beam, which is obtained by the terminal by measuring the signal strength of measurement signals on different beams of the transmission device and has the maximal signal strength; and the beam determining sub-module 9031 is configured to determine the second beam as the analog beam according to the second identification information.

Optionally, the beam information further comprises: the signal strength corresponding to the second beam, and the signal strength is the signal strength obtained by the terminal by measuring the measurement signal on the second beam; and the beam determining sub-module 9031 is configured to determine whether the signal strength corresponding to the second beam is greater than or equal to a second preset strength threshold according to the second identification information, and determine the second beam as the analog beam when the signal strength is greater than or equal to the second preset strength threshold.

Optionally, the beam information is a random access request, and the beam determining sub-module 9031 is configured to receive the random access request sent by the terminal on the second beam, and determine the second beam as the analog beam, wherein the second beam is a beam, which is obtained by the terminal by measuring the signal strength of measurement signals on different beams of the transmission device and has the maximal signal strength.

Optionally, the first obtaining module 901 is configured to receive an uplink reference signal sent by the terminal, and determine the beam information corresponding to the terminal according to the uplink reference signal; and the beam determining sub-module 9031 is configured to determine a digital beam scheduled for the terminal according to the beam information.

It should be noted that, those skilled in the art to which the present invention belongs may clearly understand that, for the convenience and brevity of the description, the specific working process and description of the apparatus described above may refer to the corresponding process in the method embodiment as shown in FIG. 1, and thus are not repeated redundantly herein.

By adoption of the above apparatus, by positioning the terminal through the beam information corresponding to the terminal and the time advance amount of the terminal in the serving cell, high-precision terminal positioning may be achieved, and the beam information of only one base station is needed to achieve the positioning in the solution, therefore the positioning implementation complexity is low.

Figure 11:
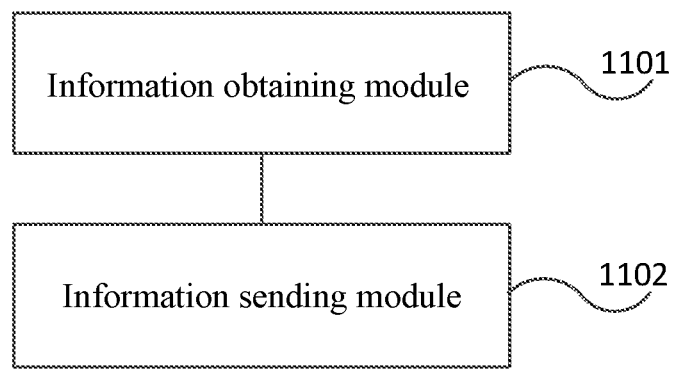
FIG. 11 is a structural schematic diagram of a third terminal positioning apparatus provided by an embodiment of the present disclosure.

FIG. 11 is a terminal positioning apparatus provided by the present disclosure, applied to a terminal, as shown in FIG. 11, comprising:

an information obtaining module 1101, configured to obtain beam information; and an information sending module 1102, configured to send the beam information to a transmission device, so that the transmission device determines location information of the terminal according to the beam information and a time advance amount after obtaining the time advance amount of the terminal in a serving cell.

Optionally, the information obtaining module 1101 is configured to detect the signal strength of measurement signals on different beams of the transmission device, and obtain the beam information according to the signal strength.

Optionally, the measurement signals include: a primary synchronization signal; or, a secondary synchronization signal; or, a shared reference symbol, wherein the shared reference symbol is a reference symbol shared by all users under the beam.

Optionally, the beam information comprises first identification information of a first beam, and the first beam is a beam whose signal strength is greater than or equal to a first preset strength threshold among the different beams;

the information obtaining module 1101 is configured to determine the first beam whose signal strength is greater than or equal to the first preset strength threshold, and generate the beam information according to the first identification information of the first beam; and the information sending module 1102 is configured to send the first identification information of the first beam to the transmission device, so that the transmission device determines an analog beam scheduled for the terminal according to the first identification information of the first beam.

Optionally, the beam information comprises second identification information of a second beam, and the second beam is a beam having the maximal signal strength among the different beams;

the information obtaining module 1101 is configured to determine the second beam having the maximal signal strength, and generate the beam information according to the second identification information of the second beam; and the information sending module 1102 is configured to send the second identification information of the second beam to the transmission device, so that the transmission device determines the analog beam scheduled for the terminal according to the second identification information of the second beam.

Optionally, the beam information further comprises: signal strength corresponding to the second beam;

the information obtaining module 1101 is configured to generate the beam information according to the signal strength; and the information sending module 1102 is configured to send the signal strength to the transmission device, so that the transmission device determines the analog beam scheduled for the terminal according to the signal strength.

Optionally, the beam information is a random access request;

the information obtaining module 1101 is configured to generate the random access request; and the information sending module 1102 is configured to determine the second beam having the maximal signal strength, and send the random access request to the transmission device on the second beam, so that the transmission device determines that the second beam on which the terminal sends the random access request is the analog beam scheduled for the terminal.

Optionally, the beam information comprises an uplink reference signal;

the information obtaining module 1101 is configured to receive uplink reference signal configuration information sent by the transmission device, wherein the uplink reference signal configuration information comprising a beam identifier and configuration information of the analog beam determined by the transmission device, and generate the uplink reference signal according to the configuration information; and the information sending module 1102 is configured to send the uplink reference signal to the terminal on the analog beam marked by the beam identifier, so that the transmission device determines a digital beam scheduled for the terminal according to the uplink reference signal.

It should be noted that, those skilled in the art to which the present invention belongs may clearly understand that, for the convenience and brevity of the description, the specific working process and description of the apparatus described above may refer to the corresponding process in the method embodiment as shown in FIG. 2, and thus are not repeated redundantly herein.

By adoption of the above apparatus, the terminal sends the obtained beam information to the transmission device, so that the transmission device positions the terminal according to the beam information and the time advance amount, thereby achieving high-precision terminal positioning, and the beam information of only one base station is needed to achieve the positioning in the solution, therefore the positioning implementation complexity is low.

The embodiment of the present disclosure further provides a non-transitory computer readable storage medium 1, the non-transitory computer readable storage medium 1 comprises one or more programs, the one or more programs are used for executing a terminal positioning method, and the method comprises: obtaining beam information corresponding to a terminal; obtaining a time advance amount of the terminal in a serving cell; and determining location information of the terminal according to the beam information and the time advance amount.

Optionally, the determining location information of the terminal according to the beam information and the time advance amount comprises: determining a beam scheduled for the terminal according to the beam information; and determining the location information of the terminal according to the determined beam and the time advance amount.

Optionally, the determining the location information of the terminal according to the determined beam and the time advance amount comprises: determining the location information of the terminal according to the determined beam and the time advance amount through a preset polarization coordinate system; wherein the preset polarization coordinate system is a polarization coordinate system generated by using the transmission device as a circle center and using a preset direction as a polar axis.

Optionally, the determining the location information of the terminal according to the determined beam and the time advance amount through a preset polarization coordinate system comprises: obtaining a polarization angle of the terminal in the preset polarization coordinate system according to the determined beam, and obtaining a polarization distance of the terminal in the preset polarization coordinate system according to the time advance amount obtained on the serving cell; and obtaining the location information of the terminal according to the polarization angle and the polarization distance.

Optionally, the obtaining a polarization angle of the terminal in the preset polarization coordinate system according to the determined beam comprises: determining the polarization angle of the location of the terminal according to the determined beam, the total number of beams under the transmission device and the width of each beam.

Optionally, the determining the polarization angle of the location of the terminal comprises: selecting an angle corresponding to a starting location of the beam where the terminal is located to serve as the polarization angle of the terminal; or, selecting the angle corresponding to a termination location of the beam where the terminal is located to serve as the polarization angle of the terminal; or, selecting the angle corresponding to any location between the starting location and the termination location of the beam where the terminal is located to serve as the polarization angle of the terminal.

Optionally, the obtaining the beam information corresponding to the terminal comprises: receiving the beam information reported by the terminal; and the determining a beam scheduled for the terminal comprises: determining an analog beam scheduled for the terminal according to the beam information.

Optionally, the beam information comprises first identification information of a first beam, and the first beam is a beam, which is obtained by the terminal by measuring the signal strength of measurement signals on different beams of the transmission device and has signal strength greater than or equal to a first preset signal strength threshold; and the determining an analog beam scheduled for the terminal according to the beam information comprises: determining the current load of each first beam according to the first identification information; and determining the first beam whose load is less than or equal to a preset load threshold as the analog beam.

Optionally, the beam information comprises second identification information of a second beam, and the second beam is a beam, which is obtained by the terminal by measuring the signal strength of measurement signals on different beams of the transmission device and has the maximal signal strength; and the determining an analog beam scheduled for the terminal according to the beam information comprises: determining the second beam as the analog beam according to the second identification information.

Optionally, the beam information further comprises: the signal strength corresponding to the second beam, the signal strength is the signal strength obtained by the terminal by measuring the measurement signal on the second beam, and the determining the second beam as the analog beam according to the second identification information comprises: determining whether the signal strength corresponding to the second beam is greater than or equal to a second preset strength threshold according to the second identification information; and determining the second beam as the analog beam when the signal strength is greater than or equal to the second preset strength threshold.

Optionally, the beam information is a random access request, and the determining an analog beam scheduled for the terminal according to the beam information comprises: receiving the random access request sent by the terminal on the second beam, wherein the second beam is a beam, which is obtained by the terminal by measuring the signal strength of measurement signals on different beams of the transmission device and has the maximal signal strength; and determining the second beam as the analog beam.

Optionally, the obtaining the beam information corresponding to the terminal comprises: receiving an uplink reference signal sent by the terminal, and determining the beam information corresponding to the terminal according to the uplink reference signal; and the determining a beam scheduled for the terminal according to the beam information comprises: determining a digital beam scheduled for the terminal according to the beam information.

The embodiment of the present disclosure further provides a non-transitory computer readable storage medium 2, the non-transitory computer readable storage medium 2 comprises one or more programs, the one or more programs are used for executing a terminal positioning method, and the method comprises: obtaining beam information; and sending the beam information to a transmission device, so that the transmission device determines location information of the terminal according to the beam information and a time advance amount after obtaining the time advance amount of the terminal in a serving cell.

Optionally, the obtaining beam information comprises: detecting the signal strength of measurement signals on different beams of the transmission device, and obtaining the beam information according to the signal strength.

Optionally, the measurement signals include: a primary synchronization signal; or, a secondary synchronization signal; or, a shared reference symbol, wherein the shared reference symbol is a reference symbol shared by all users under the beam.

Optionally, the beam information comprises first identification information of a first beam, and the first beam is a beam whose signal strength is greater than or equal to a first preset strength threshold among the different beams; and the obtaining the beam information according to the signal strength comprises: determining the first beam whose signal strength is greater than or equal to the first preset strength threshold; and generating the beam information according to the first identification information of the first beam; and the sending the beam information to a transmission device comprises: sending the first identification information of the first beam to the transmission device, so that the transmission device determines an analog beam scheduled for the terminal according to the first identification information of the first beam.

Optionally, the beam information comprises second identification information of a second beam, and the second beam is a beam having the maximal signal strength among the different beams; the obtaining the beam information according to the signal strength comprises: determining the second beam having the maximal signal strength; and generating the beam information according to the second identification information of the second beam; and the sending the beam information to a transmission device comprises: sending the second identification information of the second beam to the transmission device, so that the transmission device determines the analog beam scheduled for the terminal according to the second identification information of the second beam.

Optionally, the beam information further comprises: signal strength corresponding to the second beam, the generating the beam information according to the second identification information of the second beam comprises: generating the beam information according to the signal strength; and the sending the beam information to a transmission device comprises: sending the signal strength to the transmission device, so that the transmission device determines the analog beam scheduled for the terminal according to the signal strength.

Optionally, the beam information is a random access request, and the obtaining beam information comprises: generating the random access request; and the sending the beam information to a transmission device comprises: determining the second beam having the maximal signal strength; and sending the random access request to the transmission device on the second beam, so that the transmission device determines that the second beam on which the terminal sends the random access request is the analog beam scheduled for the terminal.

Optionally, the beam information comprises an uplink reference signal, and the obtaining beam information comprises: receiving uplink reference signal configuration information sent by the transmission device, wherein the uplink reference signal configuration information comprises a beam identifier and configuration information of the analog beam determined by the transmission device; and generating the uplink reference signal according to the configuration information; and the sending the beam information to a transmission device comprises: sending the uplink reference signal to the terminal on the analog beam marked by the beam identifier, so that the transmission device determines a digital beam scheduled for the terminal according to the uplink reference signal.

The embodiment of the present disclosure further provides a transmission device 3, wherein the transmission device 3 comprises:

the non-transitory computer readable storage medium 1 described above; and one or more processors for executing the programs in the non-transitory computer readable storage medium 1 described above.

The embodiment of the present disclosure further provides a terminal 4, wherein the terminal 4 comprises:

the non-transitory computer readable storage medium 2 described above; and one or more processors for executing the programs in the non-transitory computer readable storage medium 2 described above.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple modifications are all within the protection scope of the present disclosure.

It should be further noted that the specific technical features described in the above specific embodiments may be combined in any suitable manner without contradiction. In order to avoid unnecessary repetition, various possible combination manners are not described separately in the present disclosure.

In addition, various different embodiments of the present disclosure may also be randomly combined, and the combinations should also be considered as the contents disclosed by the present disclosure as long as not deviating from the idea of the present disclosure.

The invention claimed is:

1. A terminal positioning method, applied to a transmission device, comprising:
   obtaining beam information corresponding to a terminal;
   obtaining a time advance amount of the terminal in a serving cell; and
   determining location information of the terminal according to the beam information and the time advance amount;
   wherein said determining location information of the terminal according to the beam information and the time advance amount comprising:
      determining a beam scheduled for the terminal according to the beam information; and
      determining the location information of the terminal according to the determined beam and the time advance amount; and
      determining the location information of the terminal according to the determined beam and the time advance amount through a preset polarization coordinate system,
      wherein the preset polarization coordinate system is a polarization coordinate system generated by using the transmission device as a circle center and using a preset direction as a polar axis.

2. The method according to claim 1, wherein said determining the location information of the terminal according to the determined beam and the time advance amount through a preset polarization coordinate system further comprises:
   obtaining a polarization angle of the terminal in the preset polarization coordinate system according to the determined beam, and obtaining a polarization distance of the terminal in the preset polarization coordinate system according to the time advance amount obtained on the serving cell; and
   obtaining the location information of the terminal according to the polarization angle and the polarization distance.

3. The method according to claim 2, wherein said obtaining a polarization angle of the terminal in the preset polarization coordinate system according to the determined beam comprises:
   determining the polarization angle of the location of the terminal according to the determined beam, the total number of beams under the transmission device and the width of each beam.

4. The method according to claim 3, wherein said determining the polarization angle of the location of the terminal further comprises:
   selecting an angle corresponding to a starting location of the beam where the terminal is located to serve as the polarization angle of the terminal; or,
   selecting the angle corresponding to a termination location of the beam where the terminal is located to serve as the polarization angle of the terminal; or,
   selecting the angle corresponding to any location between the starting location and the termination location of the beam where the terminal is located to serve as the polarization angle of the terminal.

5. The method according to claim 1, wherein said obtaining the beam information corresponding to the terminal comprises:
   receiving the beam information reported by the terminal; and
   said determining a beam scheduled for the terminal according to the beam information comprises:
      determining an analog beam scheduled for the terminal according to the beam information.

6. The method according to claim 5, wherein the beam information comprises:
   first identification information of a first beam, and the first beam is a beam, which is obtained by the terminal by measuring the signal strength of measurement signals on different beams of the transmission device and has signal strength greater than or equal to a first preset signal strength threshold;
   said determining an analog beam scheduled for the terminal according to the beam information further comprises:
   determining the current load of each first beam according to the first identification information; and
   determining the first beam whose load is less than or equal to a preset load threshold as the analog beam.

7. The method according to claim 5, wherein the beam information comprises:
   second identification information of a second beam, and the second beam is a beam, which is obtained by the terminal by measuring the signal strength of measurement signals on different beams of the transmission device and has the maximal signal strength; and
   said determining an analog beam scheduled for the terminal according to the beam information comprises:
   determining the second beam as the analog beam according to the second identification information.

8. The method according to claim 7, wherein the beam information further comprises:
   the signal strength corresponding to the second beam, the signal strength is the signal strength obtained by the terminal by measuring the measurement signal on the second beam, and
   said determining the second beam as the analog beam according to the second identification information comprises:
   determining whether the signal strength corresponding to the second beam is greater than or equal to a second preset strength threshold according to the second identification information; and
   determining the second beam as the analog beam when the signal strength is greater than or equal to the second preset strength threshold.

9. The method according to claim 5, wherein the beam information is a random access request, and said determining an analog beam scheduled for the terminal according to the beam information further comprises:
receiving the random access request sent by the terminal on the second beam, wherein the second beam is a beam, which is obtained by the terminal by measuring the signal strength of measurement signals on different beams of the transmission device and has the maximal signal strength; and
determining the second beam as the analog beam.

10. The method according to claim 1, wherein said obtaining the beam information corresponding to the terminal comprises:
receiving an uplink reference signal sent by the terminal, and determining the beam information corresponding to the terminal according to the uplink reference signal; and
said determining a beam scheduled for the terminal according to the beam information comprises:
determining a digital beam scheduled for the terminal according to the beam information.

11. A terminal positioning method, applied to a terminal, comprising:
obtaining beam information; and
sending the beam information to a transmission device, so that the transmission device determines location information of the terminal according to the beam information and a time advance amount after obtaining the time advance amount of the terminal in a serving cell;
wherein said obtaining beam information comprises:
detecting the signal strength of measurement signals on different beams of the transmission device; and
obtaining the beam information according to the signal strength;
wherein the beam information comprising first identification information of a first beam, and the first beam is a beam whose signal strength is greater than or equal to a first preset strength threshold among the different beams;
said obtaining the beam information according to the signal strength comprising:
determining the first beam whose signal strength is greater than or equal to the first preset strength threshold; and
generating the beam information according to the first identification information of the first beam; and
said sending the beam information to a transmission device comprising:
sending the first identification information of the first beam to the transmission device, so that the transmission device determines an analog beam scheduled for the terminal according to the first identification information of the first beam.

12. The method according to claim 11, wherein the beam information further comprises:
second identification information of a second beam, and the second beam is a beam having the maximal signal strength among the different beams; said obtaining the beam information according to the signal strength comprises:
determining the second beam having the maximal signal strength; and
generating the beam information according to the second identification information of the second beam; and
said sending the beam information to a transmission device comprises:
sending the second identification information of the second beam to the transmission device, so that the transmission device determines the analog beam scheduled for the terminal according to the second identification information of the second beam.

13. The method according to claim 12, wherein the beam information further comprises:
signal strength corresponding to the second beam, said generating the beam information according to the second identification information of the second beam comprises:
generating the beam information according to the signal strength; and
said sending the beam information to a transmission device comprises:
sending the signal strength to the transmission device, so that the transmission device determines the analog beam scheduled for the terminal according to the signal strength.

14. The method according to claim 11, wherein the beam information is a random access request, and said obtaining beam information comprises:
generating the random access request;
said sending the beam information to a transmission device comprises:
determining the second beam having the maximal signal strength; and
sending the random access request to the transmission device on the second beam, so that the transmission device determines that the second beam on which the terminal sends the random access request is the analog beam scheduled for the terminal.

15. The method according to claim 11, wherein the beam information comprises:
an uplink reference signal, and wherein said obtaining beam information comprises:
receiving uplink reference signal configuration information sent by the transmission device, wherein the uplink reference signal configuration information comprising a beam identifier and configuration information of the analog beam determined by the transmission device; and
generating the uplink reference signal according to the configuration information; and
said sending the beam information to a transmission device comprises:
sending the uplink reference signal to the terminal on the analog beam marked by the beam identifier, so that the transmission device determines a digital beam scheduled for the terminal according to the uplink reference signal.

16. A non-transitory computer readable storage medium, wherein the non-transitory computer readable storage medium comprises one or more programs, and the one or more programs are used for executing the method according to claim 1.

17. A non-transitory computer readable storage medium, wherein the non-transitory computer readable storage medium comprises one or more programs, and the one or more programs are used for executing the method according to claim 11.

18. A transmission device, comprising:
the non-transitory computer readable storage medium according to claim 16; and
one or more processors for executing a program in the non-transitory computer readable storage medium.

19. A terminal, comprising:
the non-transitory computer readable storage medium according to claim 17; and
one or more processors for executing a program in the non-transitory computer readable storage medium.

* * * * *